United States Patent [19]

Hatfield

[11] Patent Number: 5,107,720
[45] Date of Patent: Apr. 28, 1992

[54] DEVICE FOR ACTUATING A REMOTELY POSITIONED LATCH

[75] Inventor: Hugh S. Hatfield, Lenoir City, Tenn.

[73] Assignee: Plastic Industries, Inc., Athens, Tenn.

[21] Appl. No.: 735,254

[22] Filed: Jul. 24, 1991

[51] Int. Cl.⁵ ............................................. F16C 1/10
[52] U.S. Cl. ................................. 74/502; 74/500.5; 297/354
[58] Field of Search ............ 74/500.5, 501.5 R, 501.6, 74/502; 297/354

[56] References Cited

U.S. PATENT DOCUMENTS

| | | | |
|---|---|---|---|
| 2,994,231 | 8/1961 | Gaylord | 74/471 |
| 3,042,449 | 8/1962 | Hutchinson et al. | 74/501.6 X |
| 3,101,821 | 8/1963 | Henry | 74/501.6 X |
| 4,020,713 | 5/1977 | Cantley et al. | 74/479 |
| 4,267,746 | 5/1981 | Pruett | 74/489 |
| 4,270,402 | 6/1981 | Negano | 74/473 |
| 4,644,816 | 2/1987 | Cockburn | 74/501 |
| 4,785,683 | 11/1988 | Buckley et al. | 74/489 |
| 4,872,366 | 10/1989 | Appleby et al. | 74/501 |
| 4,914,971 | 4/1990 | Hinkens et al. | 74/502 |
| 5,010,780 | 4/1991 | Hatfield | 74/501 |

Primary Examiner—Richard Lorence
Assistant Examiner—William O. Trousdell
Attorney, Agent, or Firm—Kerkam, Stowell, Kondracki & Clarke

[57] ABSTRACT

An actuator for operating a remotely positioned, for example, spring-biased latch mechanism, or mechanical actuator, by a sheathed control cable. The actuating mechanism includes a plastic housing having a pivotally mounted, hand-operated member provided with two spaced zones for receiving at least one end of a flexible control cable. The housing is also provided with a pair of elements which secure the control cable sheath adjacent each of the pair of spaced zones for receiving one end of a flexible control cable. The two positions, or spaced zones, for receiving the flexible control cable are spaced at different distances from a pivot pin for the lever actuator.

4 Claims, 4 Drawing Sheets

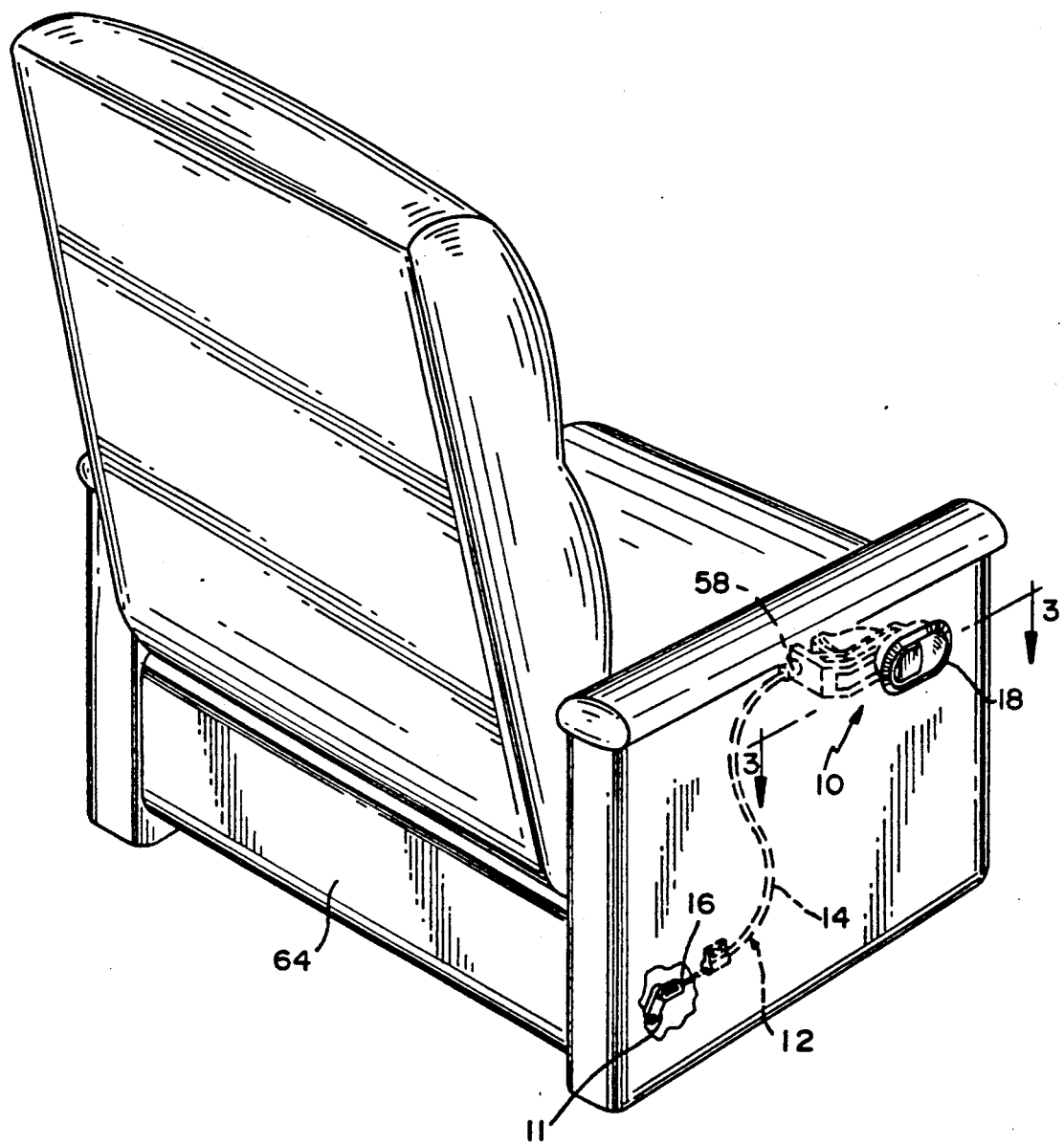
FIG_1

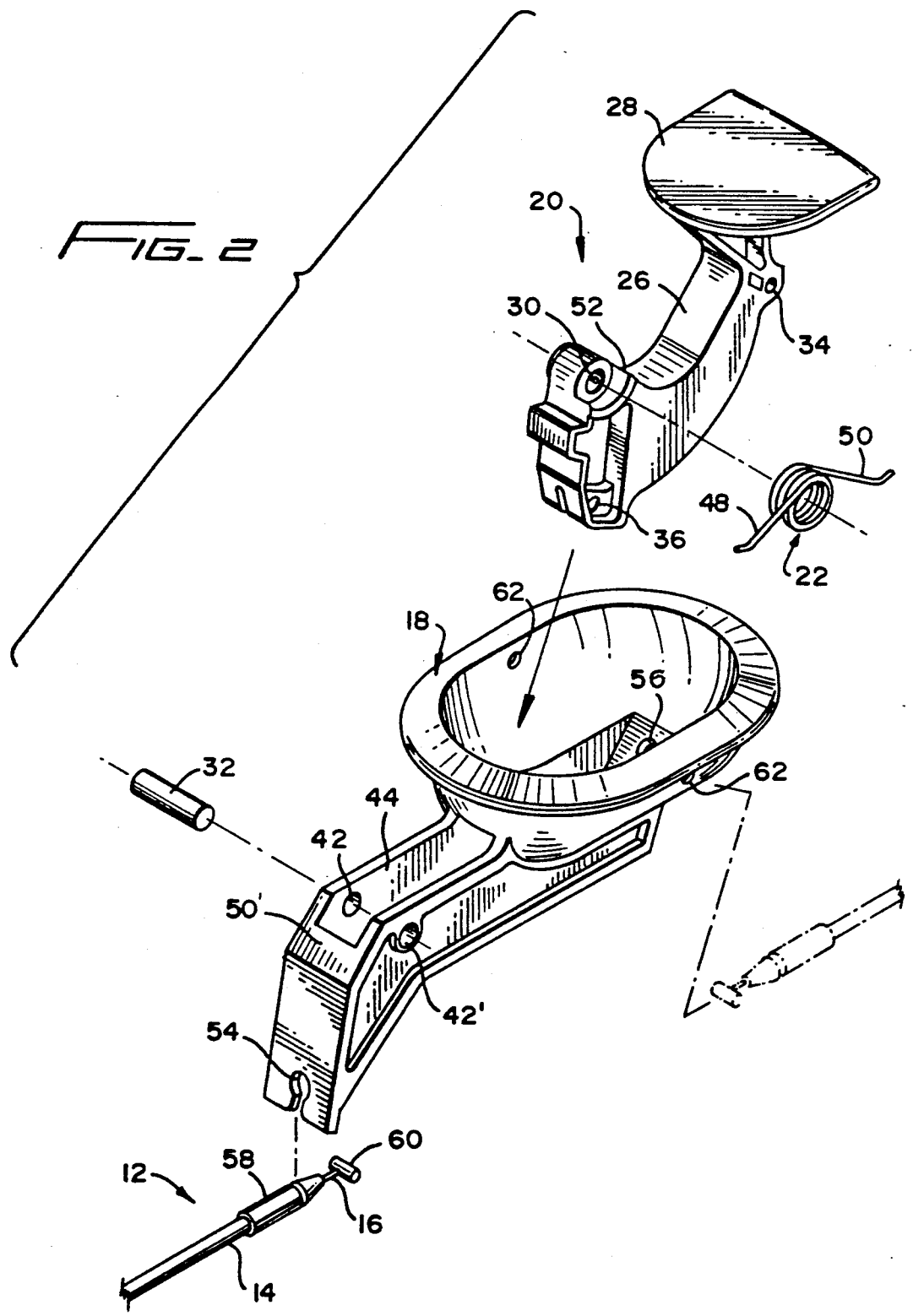

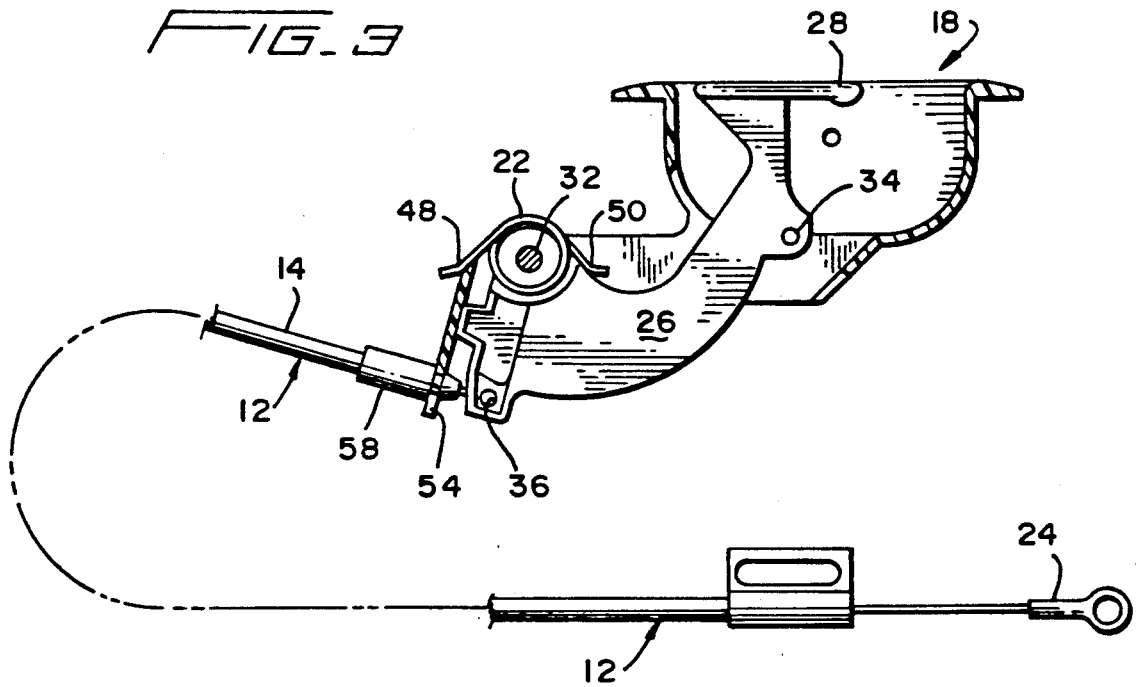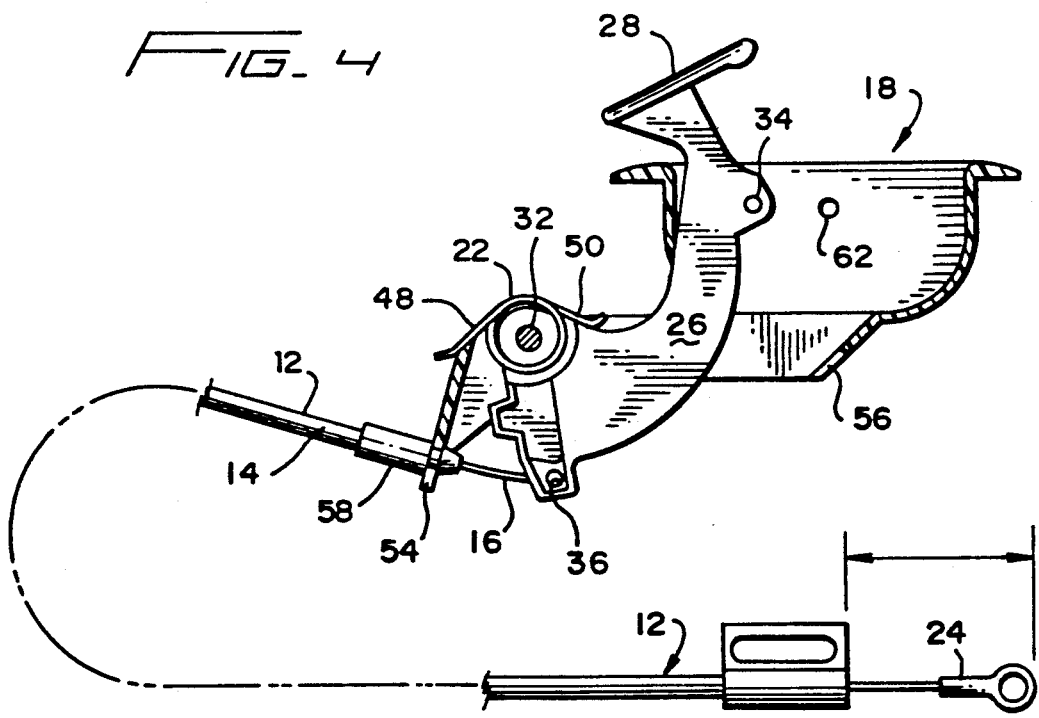

DEVICE FOR ACTUATING A REMOTELY POSITIONED LATCH

CROSS-REFERENCE TO RELATED APPLICATIONS

Related subject matter is disclosed and claimed in my U.S. Pat. No. 5,010,780, issued Apr. 30, 1991.

BACKGROUND OF THE INVENTION

1. Field of the Invention

The invention relates to a device for actuating a remotely positioned latch mechanism, or mechanical actuator, via a sheathed control cable.

2. Description of the Prior Art

Sheathed control cables are used for numerous purposes for actuating remotely positioned latch mechanisms and, in particular, for use in upholstered motion seating.

An example of such mechanism is shown and described in my U.S. Pat. No. 5,010,780.

It is the particular object of the present invention to provide a decorative, as well as a functional, assembly, which, other than the sheathed control cable, is assembled from basically injection-molded plastic components. It is another object of the invention to provide an assembly which is attachable to motion furniture and has the option of interchangeable plural points of connection for the cable.

It is a further object to provide actuators which are relatively quiet, have extended travel, low friction and can be mass produced at relatively small component cost.

SUMMARY OF THE INVENTION

According to the invention, there is provided a device for actuating a remotely positioned, spring-biased latch mechanism or mechanical actuator generally comprising a sheathed control cable having one end connected to a latch mechanism. The actuating mechanism includes a plastic housing, having pivotally mounted therein a hand-operated member provided with two spaced cable attachment zones for receiving at least one end of a flexible control cable. The housing also is provided with a pair of elements which secure the control cable sheath adjacent each of the pair of spaced cable attachment zones for receiving the one end of the flexible control cable.

BRIEF DESCRIPTION OF THE DRAWINGS

Embodiments of the invention will now be described by way of examples with reference to the accompanying diagrammatic drawings in which:

FIG. 1 is a fragmentary, perspective view of the invention applied to a motion seating;

FIG. 2 is a fragmentary, exploded view of the actuating mechanism of the invention;

FIG. 3 is a sectional view, on line 3—3 of FIG. 1, through the actuating mechanism shown in FIG. 2;

FIG. 4 is a view like FIG. 3 with the cable connected to a lower pivot connection and illustrated in the actuated position;

DESCRIPTION OF PREFERRED EMBODIMENTS

Figure 5:
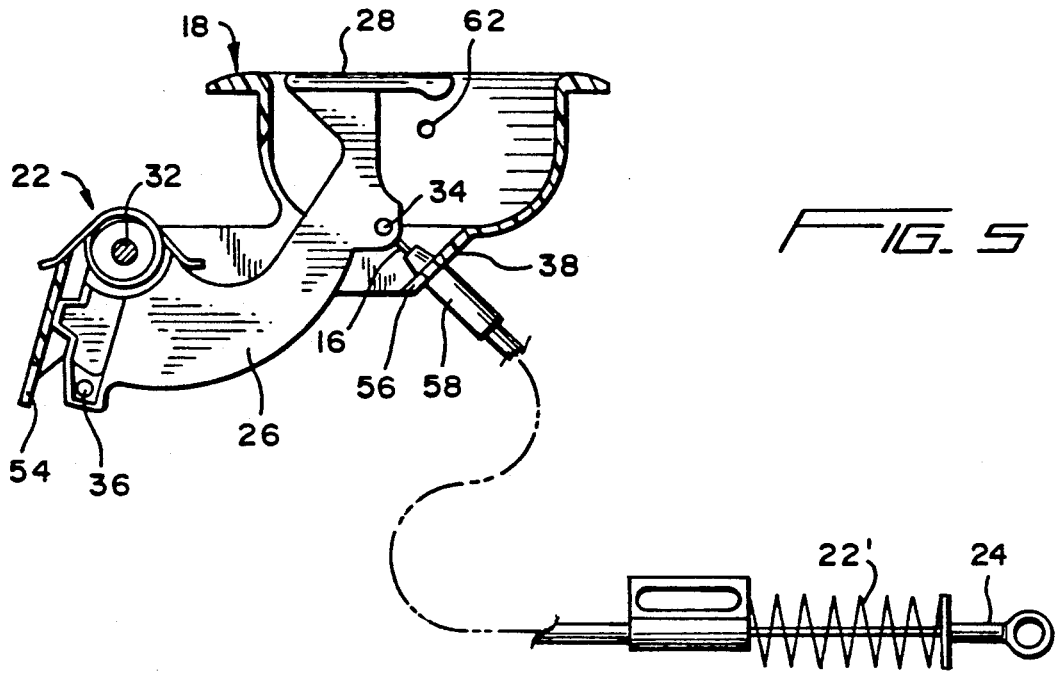
FIG. 5 is a view like FIG. 3 illustrating the cable connected to the upper cable connection point.

Referring to the drawings, the device for actuating a remotely positioned latch mechanism is generally designated 10. The latch mechanism, shown in FIG. 1 of the drawings and designated 11, is attached to the actuator via a flexible sheathed cable, generally designated 12, consisting of a sheath 14 and a flexible cable 16.

The unit 10 comprises a housing 18, a lever assembly 20 and an internal spring 22. The internal spring may be omitted if a spring 22' is employed between the end of the sheath 14 and the cable and connector 24 (FIG. 5 of the drawing).

The lever assembly, generally designated 20, includes a lever arm 26 having at one end a finger-gripping element 28. The lever 26 has a bore through a portion thereof, designated 30, which receives a pivot pin 32.

The lever also includes a first cable receiving opening 34 and a second cable receiving opening 36. The housing 18 is also bored, as at 42 and 42', to receive the pivot pin 32. A slotted portion 44, in the zone of the pivot pin receiving opening 42 and 42', is wider than the portion of the lever 26, adjacent the bore 30, such that a coil spring, generally designated 22, can be received on the pivot pin 32, as more clearly shown, for example, in FIG. 5. The spring 22 has two arms 48 and 50. The arm 48 of the spring 22 engages a wall portion 50' on the housing 18, while arm 50 of the spring 22 engages a wall portion 52 of the lever arm 26, as shown, for example, in FIGS. 2 and 3. The housing 18 is provided with a pair of keyhole-shaped openings 54 and 56, each adjacent its respective cable anchoring opening 34 and 36, to receive the fitment 58 at the inner end of each sheath cable assembly 12.

In FIGS. 2, 3 and 4, the fitment 58 is illustrated connected within the keyhole opening 54, and the cable end 60 is shown attached via the lever arm opening 36 at the shorter throw of the lever arm 26.

In a preferred embodiment, the distance between the center of pivot pin 32 and the center of the connector opening 34 is approximately 1.881" inch, while the distance between the center of pivot pin 32 and the center of the connector opening 36 is approximately 1.258" inch.

Figure 6:
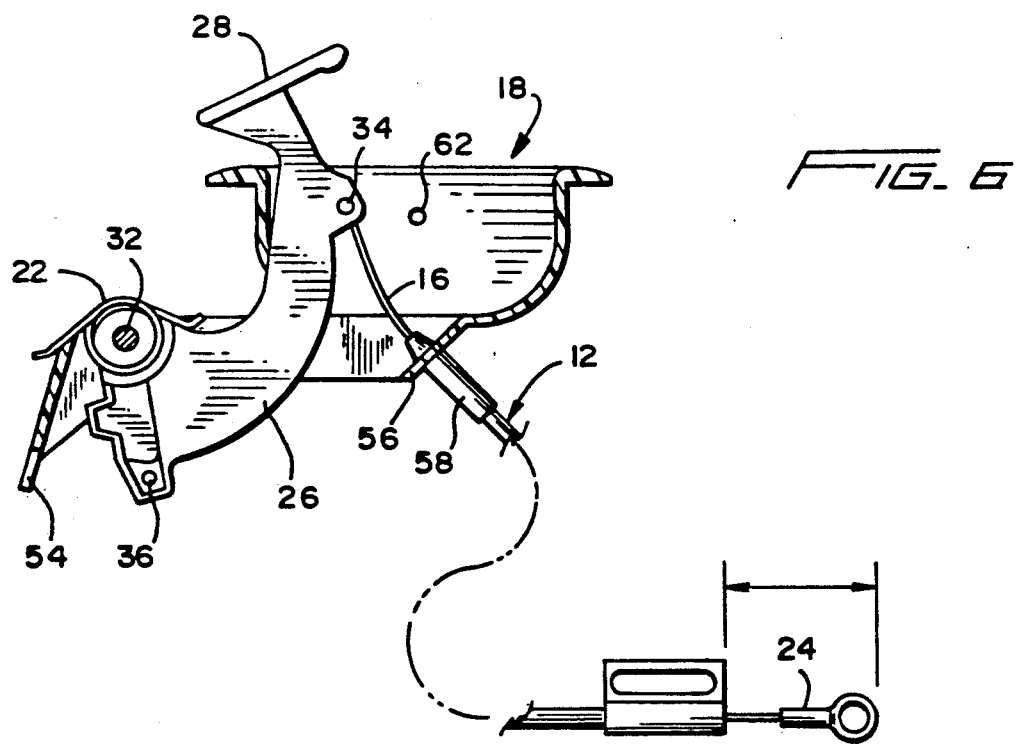
FIG. 6 is a view like FIG. 4 illustrating the lever mechanism in the actuating position.

In FIGS. 5 and 6, the fitment 58 is shown secured in the keyhole opening 56 of the housing and the cable 16 is shown anchored to the anchor opening 34 to provide for a greater distance of movement of the cable 16 when the lever is lifted by the handgrip 28, as the distance between the anchor point 34 and the center of the pivot pin 32 is greater than the distance between the pivot pin 32 and the anchor point 36 for the cable. While the distance of movement is greater in the attachment illustrated in FIGS. 5 and 6 than the attachment for the cable illustrated in FIGS. 3 and 4, the force required in the form of attachment shown in FIGS. 5 and 6 is greater than the force required to lift or pivot the lever arm in the form illustrated in FIGS. 3 and 4.

As hereinbefore stated, a spring 22' (FIG. 5) may be substituted for the spring 22, or employed in conjunction therewith. The spring 22 insures that the lever 26 returns to a neutral position, as shown in FIGS. 3 and 5, when the finger gripping table 28 is released. The above is true with only spring 22', or only spring 22, or with both springs 22' and 22.

The housing 18 is molded with, or later provided with, a pair of bores 62. The bores are provided to receive wood screws, not shown, to anchor the housing to the wooden internal frame of a recliner 64, illustrated in FIG. 1 of the drawings.

It is also pointed out that in the drawings, FIGS. 1 and 3-6, the housing is illustrated as being positioned with the axis of the pivot pin 32 in a vertical direction; however, the housing may be mounted so that the pivot pin is horizontal, or any desired angle, and the housing may be mounted to the inner surface of the recliner 64, rather than on the outer surface of the arm portion.

I claim:

1. In combination, a remotely positioned latch mechanism carried by a motion furniture, and actuating means therefor, comprising a control cable, a sheath surrounding the control cable, actuator means, one end of the control cable connected to said actuator means, a plastic housing, means pivotally mounting a lever assembly to said housing, said lever assembly providing spaced-apart zones for attaching an end of said control cable, said spaced-apart zones located at different distances from the pivotal mounting of the lever assembly, a finger-engageable platform formed at one end of the lever assembly to actuate the latch mechanism, and said housing including attaching means adjacent each zone for attaching the sheath which surrounds the control cable and means for attaching the housing to the motion furniture.

2. The combination, as defined in claim 1, further including spring means urging the lever assembly in a direction opposite to the direction of movement of the lever when actuating the latch mechanism.

3. The combination, as defined in claim 2, wherein said spring means is carried by the means pivotally mounting the lever assembly to the housing.

4. The combination, as defined in claim 2, wherein said spring means acts between the cable and the sheath.

* * * * *